June 28, 1960  H. D. REY  2,942,292
METHOD OF OPENING OYSTERS
Filed March 10, 1958  3 Sheets-Sheet 2
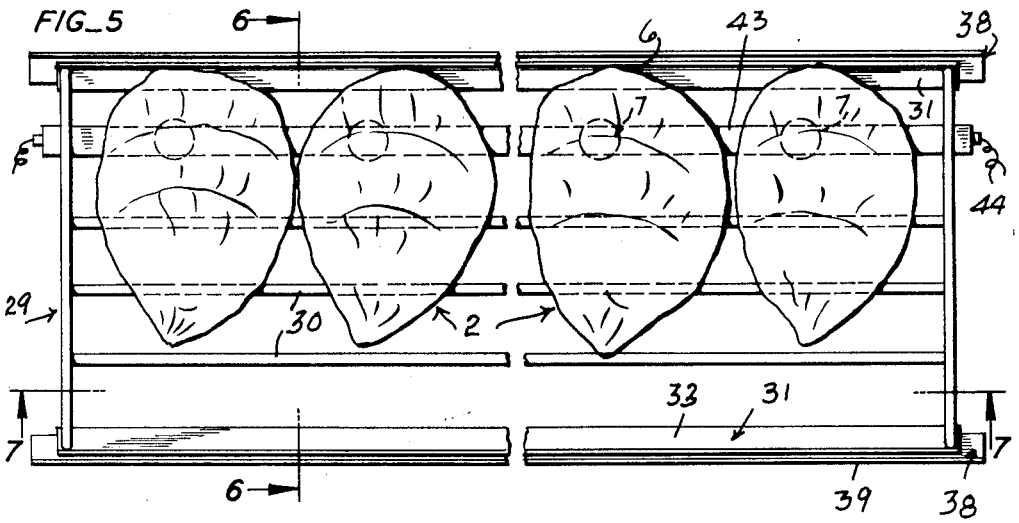
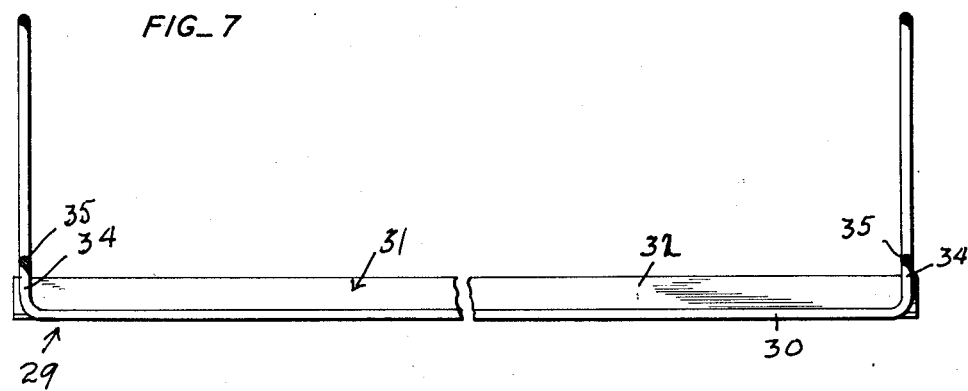
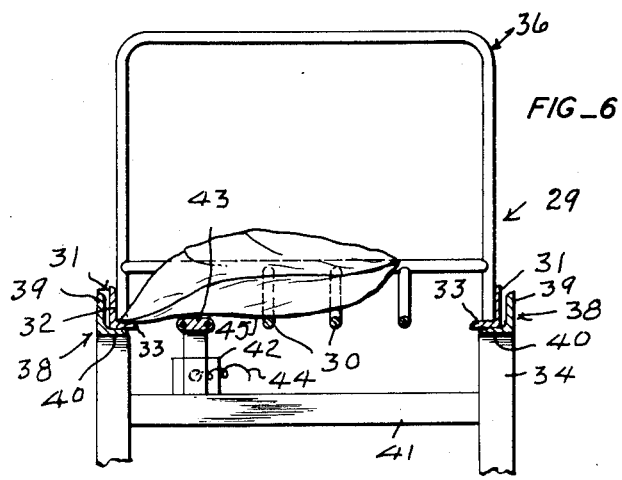
INVENTOR.
HENRI DANIEL REY
BY
Boykin, Mohler & Wood
ATTORNEYS June 28, 1960　　　　H. D. REY　　　　2,942,292
METHOD OF OPENING OYSTERS
Filed March 10, 1958　　　　　　　　　　3 Sheets-Sheet 3
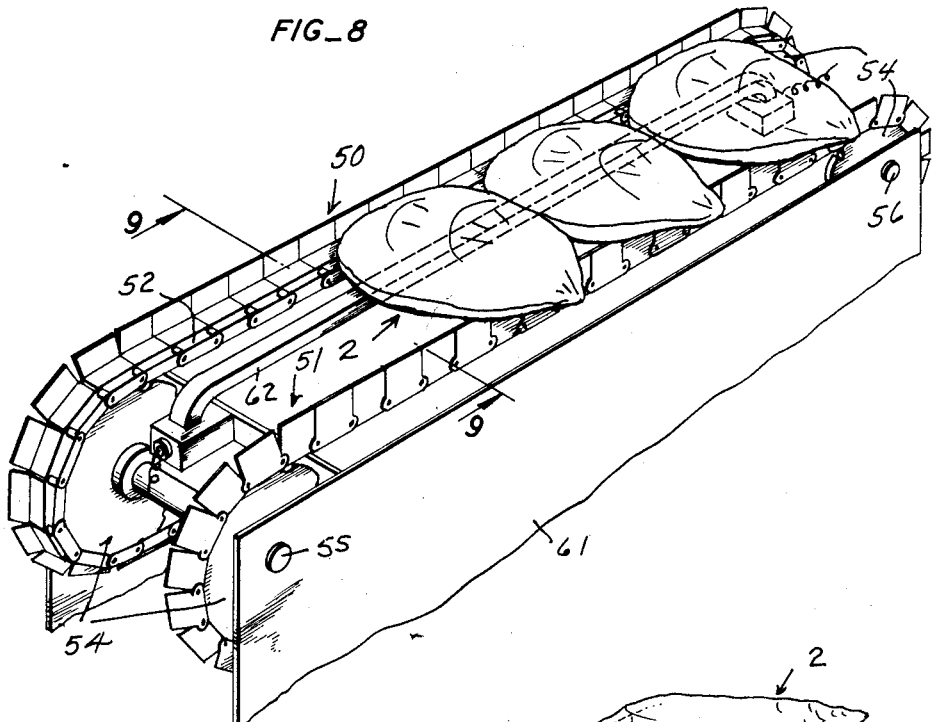
INVENTOR.
HENRI DANIEL REY

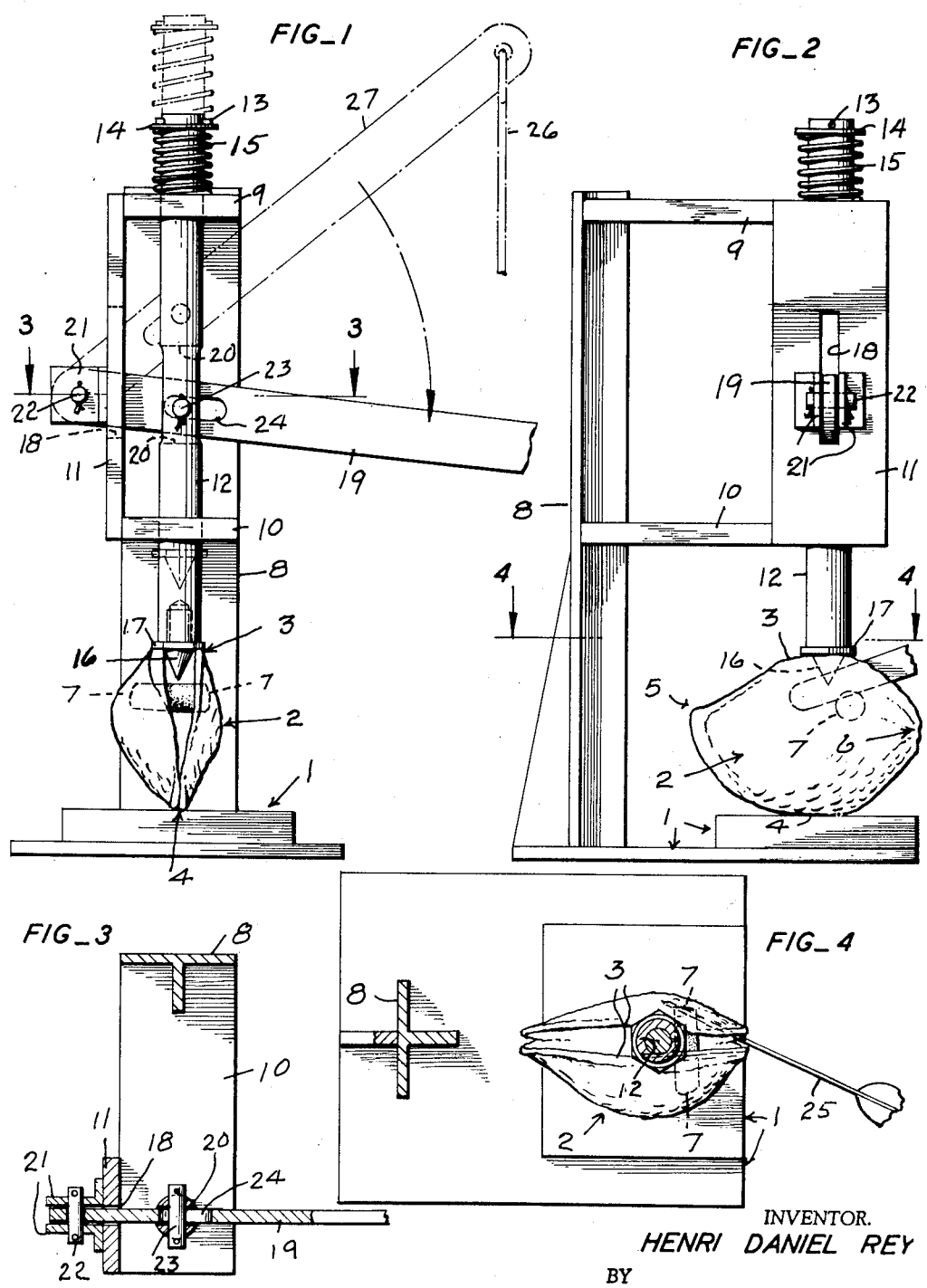

United States Patent Office 2,942,292
Patented June 28, 1960

2,942,292
METHOD OF OPENING OYSTERS
Henri Daniel Rey, Papeete, Tahiti, Society Islands
Filed Mar. 10, 1958, Ser. No. 720,285
6 Claims. (Cl. 17—45)

This invention relates to a method of removing oysters from their shells.

One of the objects of the invention is the provision of an improved method of removing live oysters from shells, quickly, and without injury to the flesh or meat, and which method does not require a skilled operator, and is safe.

Another object of the invention is the provision of a method for opening oysters quickly by an unskilled operator without injury to the meat and without breaking or mutilating either of the shell halves, and which method is safely practiced by such operator.

A still further object of the invention is the provision of a device adapted to quickly and easily break the hinge that connects the shell halves, and to open the oyster by spreading the shell halves so that the muscle attaching the meat or body to the shell halves may be quickly and easily severed by an unskilled operator.

Heretofore it has been the common practice to open oyster shells by use of a manually manipulated knife, and after the oyster has been opened, the knife is used to sever the muscles of the body of each oyster from the shell halves. This work is not only difficult to perform, but requires the services of an expert, and even then the hand holding the oyster may be accidentally cut due to accidental slippage of the knife that is held in the other hand. Furthermore, even where skilled operators are employed, the body of the oyster may be mutilated. Also the method is relatively slow. The result of the foregoing difficulties is maturally reflected in the cost of whole, raw oysters, which is very high. In some places this cost is so high that the work has been discontinued and the oysters are canned for stew, in which case the perfection of the meat is not essential.

In oysters, the shells that enclose the body of each oyster are held tightly together by the body muscles and by the hinge at one of the ends of the shells, and the closure effected by the shells is so complete that the juices within the shells and around the body are held within the shells when the oysters are removed from the water.

One of the pair of body enclosing shells is lowermost when the oyster is in its normal position in an oyster bed, and this lower shell is more convexly formed (exteriorly) than the upper shell. The upper shell is relatively flat. The body muscles are attached to the upper and lower shells at two points at opposite sides of the body, and these points are closer to the edges of the shells that are remote from the hinge, than they are to the hinge. However, the muscle attachment between the body and the upper shell half is more difficult to separate from the upper shell half than the muscle that connects the body with the lower more convexly shaped shell half, because there is a ridge in the upper shell half between the point of attachment of the muscle to said upper shell half and to the nearest edge of the shell. The cutting knife must pass over this ridge and be carefully manipulated to cut the muscle loose from the shell close to its point of attachment to the latter, to prevent cutting the main body of the oyster.

With the present method, the body muscle at its point of attachment to the upper shell half is loosened from the latter without cutting said muscle or mutilating it and without in any other manner injuring the meat. Thus the shell may be very quickly opened by a pry action of a knife between the edges of the shell and thereafter the muscle that connects the body of the oyster with the lower shell can easily be severed by the knife. These acts are readily accomplished by an unskilled person.

In the opening of oysters where the latter are used to produce oyster stew, and the like, it is not unusual to place the unopened oysters in hot water, with the result that the shells will open. However, the impurities that are loosened from the shells will contaminate the oysters unless removed, and the juices in the shells are released and are washed away when the said impurities are washed away. Furthermore, the oysters are killed by the heat and are not usable for eating as raw oysters.

In the United States coastal waters there are three main groups of oysters, classified as the Blue Point (which has many variations), the Pacific, and the Olympia oysters. The latter are not particularly important in connection with this invention since they are small and can be opened with relatively little difficulty. The oysters of the Blue Point type are found principally along the Atlantic and Gulf Coasts, and are the type that are most commonly used, and with which this invention is principally concerned, although it is not intended that the claims herein after entered are so limited.

Other objects and advantages than those hereinbefore will appear in the description and in the drawings.

In the drawings Fig. 1 is a front elevational view of a device adapted to quickly and safely open the shell of an oyster whether or not the body muscles are both attached to the shell halves.

Fig. 2 is a side elevational view of the device of Fig. 1.
Fig. 3 is a sectional view taken along line 3—3 of Fig. 1.
Fig. 4 is a sectional view taken along line 4—4 of Fig. 2.
Fig. 5 is a top plan view of a rack having oysters thereon in a position in which the oyster muscle on the upper shell half (shown as lowermost in the drawings) is being loosened from the shell half.
Fig. 6 is a sectional view along line 6—6 of Fig. 5.
Fig. 7 is a side elevational view of the device of Fig. 5.
Fig. 8 is a perspective, fragmentary view showing another device than that of Figs. 5–7 that is adapted for use in carrying out the step of loosening the body muscle of the oyster from one of the shell halves.
Fig. 9 is a sectional view along line 8—8 of Fig. 8.

In detail, referring to Figs. 1–4, any suitable base 1 may be provided, on which an oyster 2 is adapted to be supported in a vertical plane with its side edges, 3, 4, as distinguished from its hinge end 5 and the end 6 opposite thereto (Fig. 2) respectively positioned uppermost and against said base.

When the oyster is in this position, the point of muscular attachment of the body to the shell is approximately at 7.

Carried by the base 1 is a vertical post 8 that has upper and lower laterally projecting vertically spaced opposed members 9, 10 integral therewith, and the post may include a vertical plate 11 extending between and rigid with the members 9, 10 adjacent to their free outer end edges (Fig. 2).

The said members 9, 10 are formed with coaxial openings in which a vertical rod 12 is reciprocable.

The upper end of the rod 12 may carry a pin 13 against which a washer 14 is supported, and a helical spring 15 surrounding the projecting upper end of said rod reacts between the plate 7 and said washer for yieldably urging said rod to an elevated position.

The lower end of rod 12 may be tapped and threaded for the threaded end of a shank on an element 16. This element 16 is in the form of a downwardly directed point about five-eighths of an inch long and about seven-sixteenths of an inch in diameter at its base or upper end. An annular shoulder 17 on said point abuts the lower end of rod 12 and said shoulder preferably projects radially outwardly a sufficient distance to abut the lower surface of the lower member 10 through which said rod extends, thus limiting the upper movement of the rod 12.

The verical plate 11 is formed with an opening 18 (Fig. 3) intermediate its upper and lower ends, and one end of a lever arm 19 extends through said opening and through a slot 20 in rod 12. The end of the arm 19 that projects from the side of plate 11 that faces away from rod 12, extends between a pair of lugs 21 that are rigid with plate 11, and a horizontal pivot 22 pivotally connects the end of the arm 19 with said lugs, and a horizontal pivot 23 extending through the sides of slot 20 passes through a slot 24 in arm 19. Upon swinging the outer end of arm 19 downwardly, the point of the pointed element 16 will be forced between the shell halves of the oyster 2 and will force the halves apart a maximum distance of approximately seven-sixteenths of an inch, and will enter the space between said halves a distance of approximately five-eighths of an inch. The downwardly facing side of the shoulder 17 will constitute a stop to limit the degree that the element will enter the space between the shells. These dimensions are given for the reason that a much deeper penetration of the element into the shell will in many instances mutilate the flesh or meat of the oyster, and a much wider separation of the shell halves at approximately the point where the muscle attachments 7 are located will tear the meat and will mutilate it, while a lesser separation of the shell halves will fail to break the hinge 5. This, of course, refers to an untreated live oyster as delivered from its bed.

Once the shell halves are opened, as indicated, the oyster will be firmly held between shoulder 17 and the base 1 and a knife 25 can be readily inserted at the end 6 to sever the muscle 7 from one shell half or the other, or both at the inside surface of the shell.

A link or rod 26 may be connected with the outer end of arm 18, as indicated in broken lines in Fig. 1 that show arm 19 in an elevated dot-dash line position 27, if desired. This link 26 may be connected with a conventional foot actuated treadle (not shown) to operate the arm by the foot of the operator instead of using the hand on lever 19. Spring 15 will, of course, automatically return the arm 19 to position 27.

Once the oyster is free from one or the other shell halves, the operation of cutting it from the other half is simple, and may be performed in the usual manner in which the shell is held in the hand of the operator while the knife is used by the other hand.

The foregoing description applies mainly to oysters that are in their normal, live condition and in which the body muscles firmly hold the shell halves together.

As already explained, it is easy to open the shell, once one of the muscles is freed from one of the shells, and it has also been explained that the muscle connected with the top half of the oyster (when the oyster is attached to a rock or the like) is the most difficult to cut from the shell, due to a ridge in the shell between the muscle and the adjacent edge of the shell.

Referring to Figs. 5 to 7, a tray or rack 29 is provided for supporting a horizontal row of oysters 2 thereon. This tray has a horizontal row of spaced, horizontally elongated rods or heavy wires 30 disposed in side by side relation and in a horizontal plane forming the bottom of the tray, and spaced from the end rods of the row, and parallel with said end rods, are angle strips 31 that have one of their sides 32 vertical, and the other of their sides 33 extending toward each other and in approximately the same horizontal plane as that in which rods 30 are positioned.

The ends 34 of rods 30 extend upwardly for a distance and are connected at their upper ends with parallel cross rods 35 which rods may connect at their ends with the upper edges of the vertical sides 32 of the angle strips 31.

Inverted U-shaped handle members generally designated 36 are each connected at the lower free ends of the vertical sides of said U-members with the opposite corresponding ends of the angle strips 31 so that the tray may be lifted by grasping the closed upper ends of the inverted U-shaped handle members.

A support having legs 37 is provided, which legs support a pair of spaced, horizontally extending, parallel angle strips 38 (Fig. 6) at their upper ends with one side 39 of each angle strip vertical and the other side 40 lowermost and horizontal. Sides 40 extend toward each other.

The spacing of the angle strips 38 is such that the rack 29 may be supported on the lower sides 40 of the said strips 38 with the angle strips 32 of the rack on the said lower sides 40 and parallel therewith.

Cross bars 41 (Fig. 6) connecting the pairs of legs 37 that are at the corresponding ends of the angle strips may carry insulated holders 42 supporting the opposite downturned ends of a rod-like heating element 43 (Fig. 6) that is adapted to be connected in an electrical circuit 44.

The upstanding side 32 of the angle strip 31 at one side of the bottom of rack 29 is adapted to form a positioning member or stop against which the end 6 of each of the oysters 2 is adapted to be engaged when the more flattened or the normally upper side 45 of the oyster is directed downwardly. When the oysters are in this position, the heating element 43 will be in substantial engagement with the shell half 45 substantially at the point 7 of muscular attachment of the meat of the oyster with the inner surface of the shell half 45.

With this heating element at a red heat of say from approximately 1200° F. to 1500° F. and substantially in contact with the shell half 45 opposite to the point 7 for a period of approximately 15 seconds, the oyster will be released from the shell half 45 at point 7 and the meat will not be cooked nor will the flavor or physical characteristics of the meat be changed, and the shells will not open. The oyster may then be transferred to the oyster opening device of Fig. 1 if desired and it will be easily opened, or it may be even held in the hand and easily opened with a knife, since the only resistance to its opening is at the hinge 6, which is relatively slight. The oyster shells will not be separated when the heat is applied at the point 7 as above described, hence the juices within the shell will not be lost nor will the oyster be killed or injured. The heat transferred to the shell itself is insufficient to cause discomfort to the hand holding the oyster and in contact with the shell where it has been heated even when the shell is immediately held after heating.

Obviously a flame or any other source of heat substantially restricted to the shell at point 7 would have the same result provided it were adequate and substantially comparable to the heat of the heating element 43.

Normally the oysters, when held commercially before use, are put in water immediately, and the juice in the shell is essential to keeping the oyster alive and healthy, and when, by the present method, the body of the oyster is cut from the other half of the shell relative to the one that has been placed adjacent to the heating element, the body is the same as though the oyster was opened by a knife or other instrument and both points of attachment to the shell halves were cut loose in the conventional way except that the muscle is more cleanly released from shell 45.

Fig. 8 is merely a modified form of the apparatus that may be employed in the heating step.

The oysters 2 are positioned on spaced endless supports 50, 51 that may be respectively carried on spaced sprocket chains 52, 53 extending over sprocket wheels 54 at the opposite ends of the chains. The pair of wheels 54 at each of the corresponding ends of the chains are secured on shafts 55, 56 and shaft 56 may be rotated by a belt connection 57 with a pulley on the driven shaft 58 of a suitable speed reducer 59. The reducer 59 may be driven by a motor 60, and shafts 55, 56 may be journalled for rotation in any suitable frame 61.

Between the supports 50 is an elongated electrical heating element 62 that is positioned to lie substantially directly below the points 7 on the oysters where the muscles connect the bodies of the oysters with the lower shell 45.

The supports 50 may be angle pieces having horizontal ledges 62 (Fig. 9) on which one of the ends of the oysters 2 may be positioned with the terminating end edges of the shells at said ends abutting the vertical side 63 of each angle piece, while the supports 51 may be vertical pieces 64 on which the oysters are supported adjacent to their ends that are opposite to supports 50.

While the drawing shows the heating element 51 as being almost the same length as the upper runs of the supports 50, 51 it is obvious that the latter may be considerably longer than are shown, if desired, to provide a longer loading station at one of their ends. In any event, the oysters are positioned on the supports 50, 51 at one of their ends and they will carry the oysters over the heating element longitudinally of the latter and relatively close to the element. The temperature of the element 62 is substantially the same as that of the element 43 of Figs. 5, 6 and the rate of travel of the oysters is such that they will be over element 62 for substantially 15 seconds.

It is not intended that the temperature range of approximately 1200° F. to 1500° F. and the time period of 10 to 20 seconds, insofar as the invention as shown in Figs. 5 and 8 are concerned, be absolute limitations for reasons above given, since iced oysters and oysters from water of around 50° F. temperature will require variations in time of application of the heat at least. Also, some shells are thicker than others. On the whole, it has been found that variations of the temperature of the heating element between approximately 1000° F. and 2000° F. and variations in time from approximately 10 seconds to 20 seconds will satisfactorily meet most conditions. With the elements 43, 62 at a red heat and approximately in contact with the shell for approximately 15 seconds, the muscle will release from the shell at point 7 on the inside of the shell opposite to the element, and the meat will not be cooked or changed in flavor, nor will the oyster be killed.

The temperature of the heating means must be sufficient to cause the oyster to release its hold on the shell, but it must not be applied for a length of time that would cook the meat or change the flavor of the meat. In addition, the time factor should be one that requires the least time. Whether the heating is by conduction or by radiation is immaterial. Fig. 6 shows heating substantially by conduction while Fig. 9 shows it by radiation. However, when the latter is used the heat should be localized on the surface of the shell to substantially point 7, and at approximately the temperature of the heating element at that point.

The word "oyster" as hereinbefore used refers to the complete oyster including the shell enclosing the body of the oyster, and the word "body" refers to the meat or flesh of the oyster. Also a "raw" oyster means a fresh live oyster.

The word "shell" or the words "oyster shell" are quite commonly used to refer to the shell enclosure for the body, which actually consists of an upper and a lower shell, or shell halves, although each half is a shell in itself. The "opening of an oyster" means the opening of the shell or the spreading apart of the upper and lower shells so as to obtain access to the body or body muscle that is attached to the shells.

It may be further explained that while the conventional method of removing the oyster body from its shell enclosure requires cutting the body muscle free from the shell, this is not because the muscle is integral with the shell, since the oyster can and does release the body muscle from the shell by the method herein described, and heat could be applied successively or simultaneously to the top and bottom shells at the points of connection of the muscles to the top and bottom shells if desired.

It is to be understood that the detailed description and drawings are not intended to be limitations on the invention, and the claims appended hereto are intended to include any modifications that may come within the scope of the invention.

I claim:

1. The method of releasing one of the body enclosing shells from the body of a raw oyster enclosed thereby that includes the step of: heating one of said body enclosing shells at the point of attachment of said body with said one of said shells to a temperature and for a period of time sufficient to cause said body to release its hold on said one of said shells at said point, said heat being substantially restricted to the said one of said shells at said point of attachment whereby the body of said oyster around said point will be substantially unaffected by said heating step.

2. The method of releasing one of the body enclosing shells from the body of a raw oyster enclosed thereby that includes the step of: heating one of said body enclosing shells at the point of attachment of said body with said one of said shells to a temperature between 1000° F. and 2000° F. for a period of time between 10 seconds and 20 seconds, said heat being substantially restricted to said one of said shells at said point of attachment.

3. The method of releasing one of the body enclosing shells of a pair thereof from the body of a raw oyster enclosed thereby that includes the step of; supporting said pair of shells in a position with the point of attachment between said body and one shell of said pair in unobstructed, closely adjacent relation to a source of heat having a temperature of between approximately 1000° F. and 2000° F. for a period of time between approximately 10 seconds and 20 seconds, and then removing said shells from within the influence of heat from said source.

4. The method of opening a raw oyster having a pair of shells in body enclosing relation to the body of the oyster that comprises the steps of: causing said body to release its hold on one shell of said pair by heating substantially only the portion of said one shell at its point of attachment to said body to a temperature of between approximately 1000° F. and 2000° F. for a period of time between approximately 10 seconds and 20 seconds, then swinging said shells apart and removing said body from said shells.

5. The method of opening an oyster having a lower shell that is normally exteriorly connected to an object in the water, and having an upper shell connected with said lower shell in enclosing relation to the oyster body, said method comprising the steps of: supporting said oyster in a position with the point of attachment between said body and said lower shell closely adjacent to and within the full influence of heat from a source that is substantially restricted to said point and having a temperature of between approximately 1000° F. and 2000° F. for a period of time between approximately 10 seconds and 20 seconds whereby the portion of said lower shell that is attached to said body will be heated by heat from said source for said period of time, thereafter removing said oyster from the influence of said heat and moving said upper shell and said lower shell relatively apart with said body being carried with said upper shell, and finally severing said body from its point of attachment with said upper shell and removing said body from said upper shell.

6. The method of opening raw oysters that comprises the steps of: supporting a plurality of oysters in a row with the pair of shells of the respective oysters in tight body enclosing relation to the oyster bodies, and with the points of attachment between the said oyster bodies of said row and the shells enclosing them being substantially in alignment longitudinally of said row, moving said row of oysters longitudinally of said row and at the same time heating one shell of each pair enclosing each oyster at the point of attachment between such one shell and the body enclosed between each pair of shells to a temperature of between approximately 1000° F. and 2000° F. for a period of time between approximately 10 seconds and 20 seconds only, then moving each pair of body enclosing shells relatively away from each other and finally removing the oyster body from said shells.

References Cited in the file of this patent

UNITED STATES PATENTS

| | | |
|---|---|---|
| 2,354,928 | Ragupos | Aug. 1, 1944 |
| 2,391,739 | Ragupos | Dec. 25, 1945 |
| 2,608,716 | Harris | Sept. 2, 1952 |
| 2,823,414 | Seal et al. | Feb. 18, 1958 |